United States Patent
Ichikawa

(10) Patent No.: US 7,486,753 B2
(45) Date of Patent: Feb. 3, 2009

(54) SYNCHRONIZATION ESTABLISHMENT CIRCUIT AND SYNCHRONIZATION ESTABLISHMENT METHOD

(75) Inventor: Takeshi Ichikawa, Tokyo (JP)

(73) Assignee: Oki Semiconductor Co., Ltd. (JP)

( * ) Notice: Subject to any disclaimer, the term of this patent is extended or adjusted under 35 U.S.C. 154(b) by 709 days.

(21) Appl. No.: 10/944,896

(22) Filed: Sep. 21, 2004

(65) Prior Publication Data

US 2005/0220234 A1    Oct. 6, 2005

(30) Foreign Application Priority Data

Apr. 1, 2004    (JP) .............................. 2004-109148

(51) Int. Cl.
*H04L 7/00*    (2006.01)
(52) U.S. Cl. ...................... 375/354; 375/355; 455/502; 327/141
(58) Field of Classification Search ................ 375/354, 375/355; 370/324; 327/141
See application file for complete search history.

(56) References Cited

U.S. PATENT DOCUMENTS 5,596,582 A * 1/1997 Sato et al. ................... 370/509
5,694,392 A * 12/1997 Gaglione et al. ............. 370/337
5,809,220 A * 9/1998 Morrison et al. .............. 714/12
6,154,468 A * 11/2000 Lin et al. ..................... 370/510
2002/0181459 A1* 12/2002 Ohta et al. .................. 370/389

FOREIGN PATENT DOCUMENTS

JP    2003-60652    2/2003

* cited by examiner

*Primary Examiner*—David C Payne
*Assistant Examiner*—Leon Flores
(74) *Attorney, Agent, or Firm*—Studebaker & Brackett PC; Donald R. Studebaker

(57) ABSTRACT

A terminal is wirelessly connected to a base station. The terminal has a timer and a controller. The timer has a register for storing a beacon interval as a comparison value. The timer also includes a beacon counter for counting timer clocks. The timer also includes a comparator for generating an interrupt signal when an output value of the register and a count value of the counter match. The controller causes the counter to start counting when it receives a beacon for the first time. The controller causes the register to store the count value of the beacon counter when it receives a beacon next time. Since the beacon interval is measured using the timer clock in the terminal, instead of using the beacon interval information included in the beacon, it is unnecessary to strictly match the clock precision of the base station and the terminal, and therefore the cost of the system decreases.

12 Claims, 8 Drawing Sheets

RELATED ART

US 7,486,753 B2

SYNCHRONIZATION ESTABLISHMENT CIRCUIT AND SYNCHRONIZATION ESTABLISHMENT METHOD

BACKGROUND OF THE INVENTION

1. Field of the Invention

The present invention relates to a synchronization establishment circuit and synchronization establishment method for generating internal signals that synchronize with external signals provided at a predetermined cycle. The present invention can be applied to the synchronization establishment between a base station and terminals in a radio network, such as a beacon network.

2. Description of the Related Art

A beacon network is known as a type of radio network. As FIG. 9 of the accompanying drawings shows, the beacon network 900 is comprised of one base station 910 and many terminals 920, 920 . . . . The base station 910 and each terminal 920 are connected wirelessly.

In the beacon network 900, synchronization must always be established between the base station 910 and each terminal 920. Therefore in the beacon network 900, data having a predetermined format, called a beacon, is regularly sent from the base station 910 to each terminal 920. Each terminal 920 can know the timing when the base station 910 sends a beacon (i.e., data transmission timing), and the relationship between the data transmission timing and the data transmission/reception enable period by analyzing the data in the received beacon. Based on this information, each terminal 920 transmits/receives data to/from the base station 910.

FIG. 10 and FIG. 11 of the accompanying drawings depict the operation of the base station 910. FIG. 10 is a timing chart, and FIG. 11 is a flow chart.

As shown in FIG. 10 and FIG. 11, the base station 910 sends one beacon at each beacon interval T_Beacon. After a beacon is sent (see step S1101 in FIG. 11), the base station 910 enters transmission/reception enable status (see step S1102 in FIG. 11). When the period T_ON elapses from the transmission of the beacon (see step S1103 in FIG. 11), the transmission/reception enable status ends, and the base station 910 stops (see step S1104 in FIG. 11). Then the period T_Beacon elapses from the transmission of the beacon (see step S1105 in FIG. 11), and the next beacon is sent from the base station 910 (see step S1101 in FIG. 11).

Such information as the beacon interval T_Beacon and transmission/reception enable period T_ON is included (carried) in a beacon. Each terminal 920 must analyze the information included in the beacon, and perform internal control to communicate with the base station 910 within the transmission/reception enable period. In order to stably perform network communication, control of the operation of each terminal 920 must be synchronized with the operation of the base station 910 at high precision using the beacon interval T_Beacon.

Synchronizing the base station 910 and the terminal 920 at high precision makes the cost of the beacon network 900 enormously expensive. To implement synchronization at high precision, the clock precision of the base station 910 and the terminal 920 must be matched strictly. Thus, a clock generation circuit with extremely high precision must be installed for each of the base station 910 and the terminal 920. This shortcoming becomes more conspicuous as the beacon interval T_Beacon becomes longer. This is because as the beacon interval T_Beacon becomes longer, the influence of the difference of the clock precision between the base station 910 and the terminal 920 becomes significant. For example, when the room temperature in a factory or the temperature of a refrigerator is managed by a beacon network 900, the beacon interval T_Beacon is set to be very long, since management in a short cycle is not only necessary but also increases the power consumption of the terminal. However, if the beacon interval T_Beacon is very long, the synchronization shift between the base station 910 and the terminal 920 becomes very large.

Use of the same clock for both the base station 910 and the terminal 920 is disclosed in Japanese Patent Kokai (Laid-Open Application) No. 2003-60652, for example. In this document, the PLL circuit in the terminal generates clocks for synchronization using the cycle of the beacon received from the base station. A clock for synchronization in the terminal is generated based on the clock of generating the beacon in the base station, so that the base station and the terminal can be synchronized at high precision.

However, Japanese Patent Kokai No. 2003-60652 must use a PLL circuit. Thus, the control circuit scale is large and cost is high.

SUMMARY OF THE INVENTION

One object of the present invention is to provide an inexpensive circuit for establishing synchronization between a plurality of devices.

Another object of the present invention is to provide an improved method of establishing synchronization between a plurality of devices.

According to a first aspect of the present invention, there is provided an improved synchronization establishment circuit for generating an internal signal that synchronizes with an external signal supplied at a predetermined cycle. This synchronization establishment circuit includes a register for storing the predetermined cycle as a comparison value, a counter for counting a timer clock when a timer enable signal is active, and a comparator for generating the internal signal when an output value of the register and a count value of the counter match. The synchronization establishment circuit also includes a controller for activating the timer enable signal when the external signal is received, and storing the count value of the counter as a comparison value in the register when the external signal is received next time, so as to control synchronization establishment between the external signal and the internal signal.

The reception interval of the external signal is counted by the timer clock, and the cycle of the internal signal is determined using this count result. Therefore, synchronization can be established by an inexpensive circuit with a very simple structure.

According to a second aspect of the present invention, there is provided an improved synchronization establishment method for synchronizing an internal signal with an external signal supplied at a predetermined cycle by controlling a synchronization establishment circuit. The synchronization establishment circuit includes a register for storing the predetermined cycle as a comparison value, a counter for counting a timer clock when a timer enable signal is active, and a timer comparator for generating the internal signal when an output value of the register matches a count value of the counter. This method includes activating the timer enable signal when the external signal is received, and storing a count value of the counter as the comparison value in the register when the external signal is received next time.

Since the reception interval of the external signal is counted by the timer clock, and the cycle of the internal signal is determined using this count result, synchronization can be established by an inexpensive circuit with a very simple structure.

These and other objects, aspects and advantages of the present invention will become apparent to those skilled in the art from the following detailed description and appended claims when read and understood in conjunction with the accompanying drawings.

DETAILED DESCRIPTION OF THE INVENTION

Figure 1:
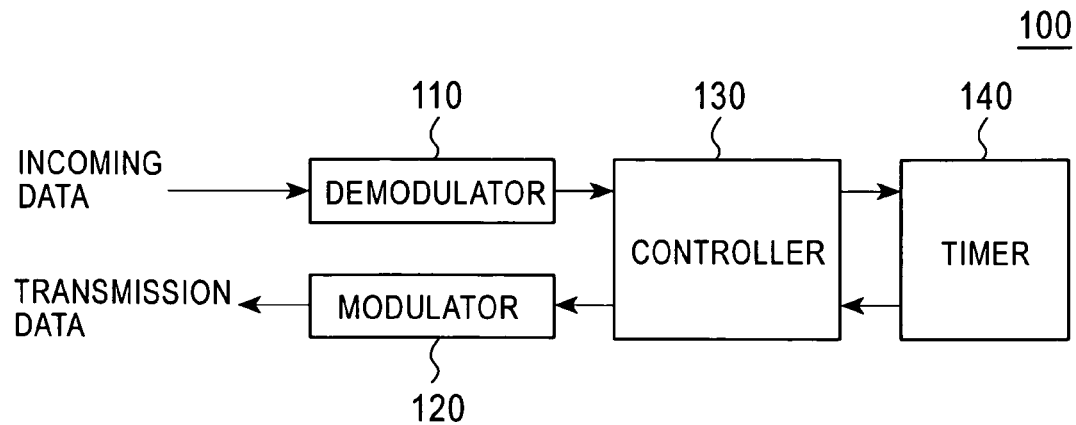
FIG. 1 is a block diagram depicting a schematic configuration of a terminal according to the first embodiment of the present invention.

Embodiments of the present invention will now be described with reference to the drawings. In the drawings, the size, shape and positional relationship of each composing element are rough enough to assist in understanding this invention, and the numerical conditions indicated below are merely examples.

First Embodiment

A synchronization establishment circuit according to the first embodiment will now be described with reference to FIG. 1 to FIG. 4. The present invention is applied to synchronization between a base station and a terminal of a beacon network in this embodiment.

Figure 9:
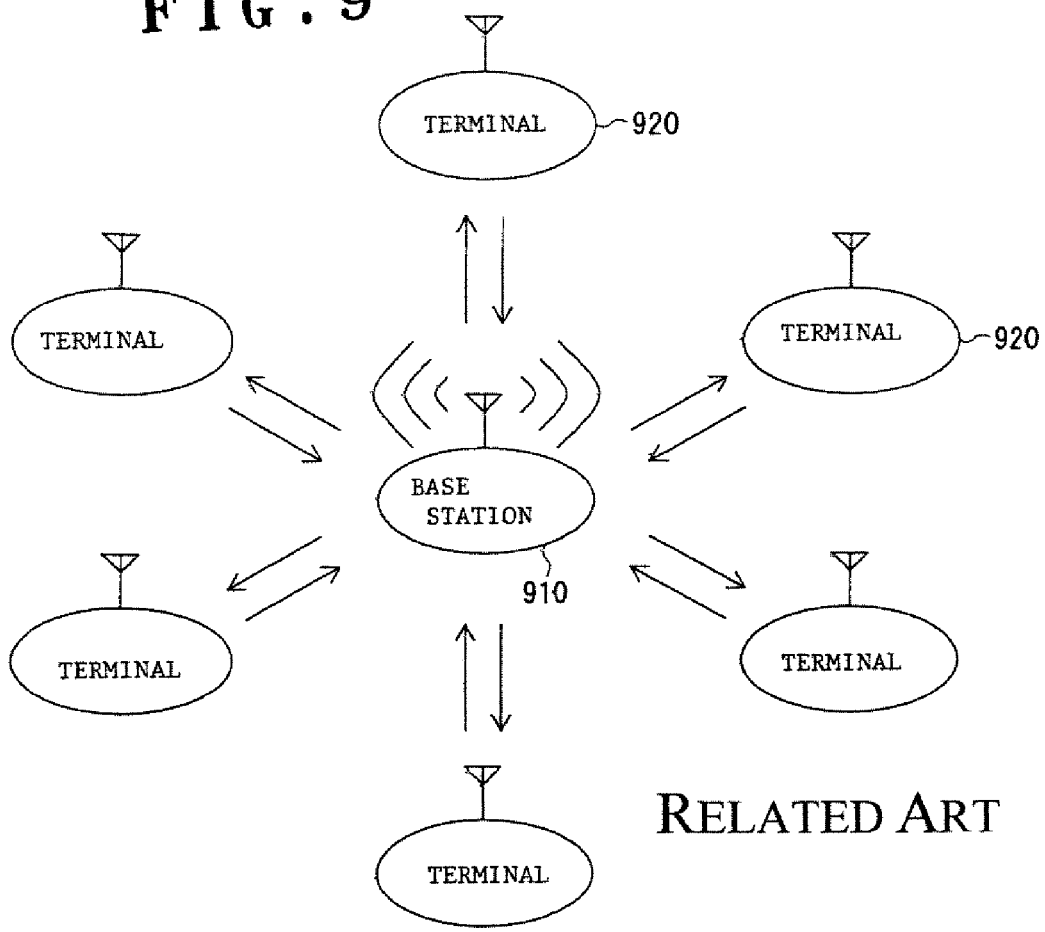
FIG. 9 schematically depicts a beacon network.

The general configuration of the beacon network used in the present embodiment is the same as a conventional beacon network (see FIG. 9), so that description thereof will be omitted.

FIG. 1 is a block diagram depicting a general configuration of the terminal 100 according to the present embodiment. As FIG. 1 shows, this terminal 100 includes a demodulator 110, modulator 120, controller 130 and timer 140. The controller 130 and the timer 140 are the synchronization establishment circuit.

The demodulator 110 receives radio signals transmitted by the base station 910 (see FIG. 9), and converts these radio signals into digital data. The digital data acquired in this way is sent to the controller 130.

The modulator 120 converts the digital data, which is supplied from the controller 130, into ratio signals, and transmits them. The transmitted radio signals are received by the base station 910.

The controller 130 extracts beacons from the digital data which is provided from the demodulator 110, and extracts and analyzes the beacon interval T_Beacon and the transmission/reception enable time T_ON of the base station from the beacons. The controller 130 controls the timer 140 based on the result of this analysis, and generates the beacon timer interrupt signal BI and the ON timer interrupt signal OI (described later). While managing the timing using these interrupt signals BI and OI, the controller 130 performs general control based on the received data, and generates transmission data.

The timer 140 generates the beacon timer interrupt signal BI and the ON timer interrupt signal OI under the control of the controller 130, as described above.

Figure 2:
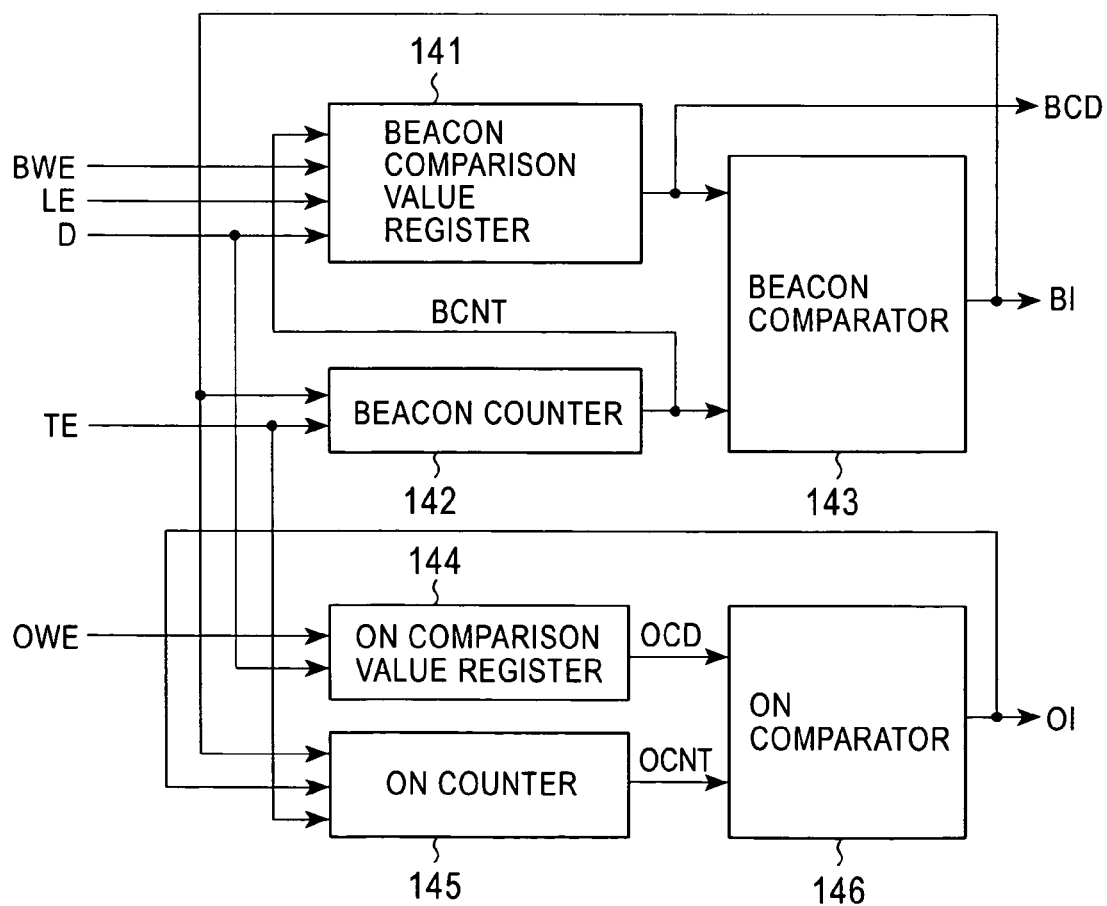
FIG. 2 is a block diagram depicting an internal configuration of a timer shown in FIG. 1.

FIG. 2 is a block diagram depicting the internal configuration of the timer 140. As FIG. 2 shows, the timer 140 includes a beacon comparison value register 141, beacon counter 142, beacon comparator 143, ON comparison value register 144, ON counter 145 and ON comparator 146.

The beacon comparison value register 141 is a register for holding data corresponding to the generation cycle of the beacon timer interrupt signal BI as a comparison value. This beacon comparison value register 141 captures the data D (data corresponding to the generation cycle of the signal BI) which is supplied from the controller 130 at the rise timing of the write enable signal BWE which is supplied from the controller 130, and holds it as the comparison value. The beacon comparison value register 141 also captures the count value of the beacon counter 142 at the rise timing of the load enable signal LE which is supplied from the controller 130, and holds it as a comparison value. The stored values of the beacon comparison value register 141 are introduced to the beacon comparator 143 and controller 130 as the comparison value data BCD.

The beacon counter 142 is an up counter for counting a timer clock (not illustrated). The beacon counter 142 starts counting at the rise timing of the timer enable signal TE which is supplied from the controller 130. The count value BCNT is sequentially sent to the beacon comparator 143. The beacon counter 142 receives the beacon timer interrupt signal BI as a reset signal. The beacon counter 142 resets the count value BCNT to zero at the rise timing of the beacon timer interrupt signal BI.

The beacon comparator 143 compares the comparison value BCD which is supplied from the beacon comparison value register 141 and the count value BCNT which is supplied from the beacon counter 142. The beacon comparator 143 generates the beacon timer interrupt signal BI when the values of the data BCD and BCNT match.

The ON comparison value register 144 is a register for holding the data corresponding to the generation cycle of the ON timer interrupt signal OI as a comparison value. In this ON comparison value register 144, the data D is captured at the rise timing of the write enable signal OWE which is supplied from the controller 130, and is held as a comparison value. The ON comparison value register 144 supplies the stored comparison value OCD to the ON comparator 146.

The ON counter 145 is an up counter for counting the timer clock (not illustrated). The ON counter 145 starts counting at a rise timing of the timer enable signal TE. The count value OCNT is sequentially sent to the ON comparator 146. The ON counter 145 receives the ON timer interrupt signal OI as a reset signal. At the rise timing of this ON timer interrupt signal OI, the ON counter 145 stops counting and also resets the count value OCNT to zero. The ON counter 145 restarts counting when the ON counter 145 receives the beacon timer interrupt signal BI.

The ON comparator 146 compares the comparison value OCD supplied from the ON comparison value register 144 and the count value OCNT supplied from the ON counter 145. The ON comparator 146 generates the beacon timer interrupt signal OI when the values of the data OCD and OCNT match.

Now, the operation of the terminal 100 will be described with reference to the time chart in FIG. 3 and the flow chart in FIG. 4.

At first, the terminal 100 performs the synchronization establishment operation. In the present embodiment, it is assumed that the beacon comparator 143 and the ON comparator 146 do not operate during the synchronization establishment operation, and therefore the signals BI and OI are not generated.

When the terminal 100 receives the first beacon, this beacon is converted into digital data by the demodulator 110, and is sent to the controller 130.

The controller 130 extracts and analyzes the beacon interval T_Beacon and the base station transmission/reception enable time T_ON from the input beacon (first beacon), and generates the base station transmission/reception enable time T_ON as data D. The controller 130 also rises the write enable signal OWE (see step S401 in FIG. 4). Accordingly, the base station transmission/reception enable time T_ON is written to the ON comparison value register 144 (see step S402 in FIG. 4).

Figure 3:
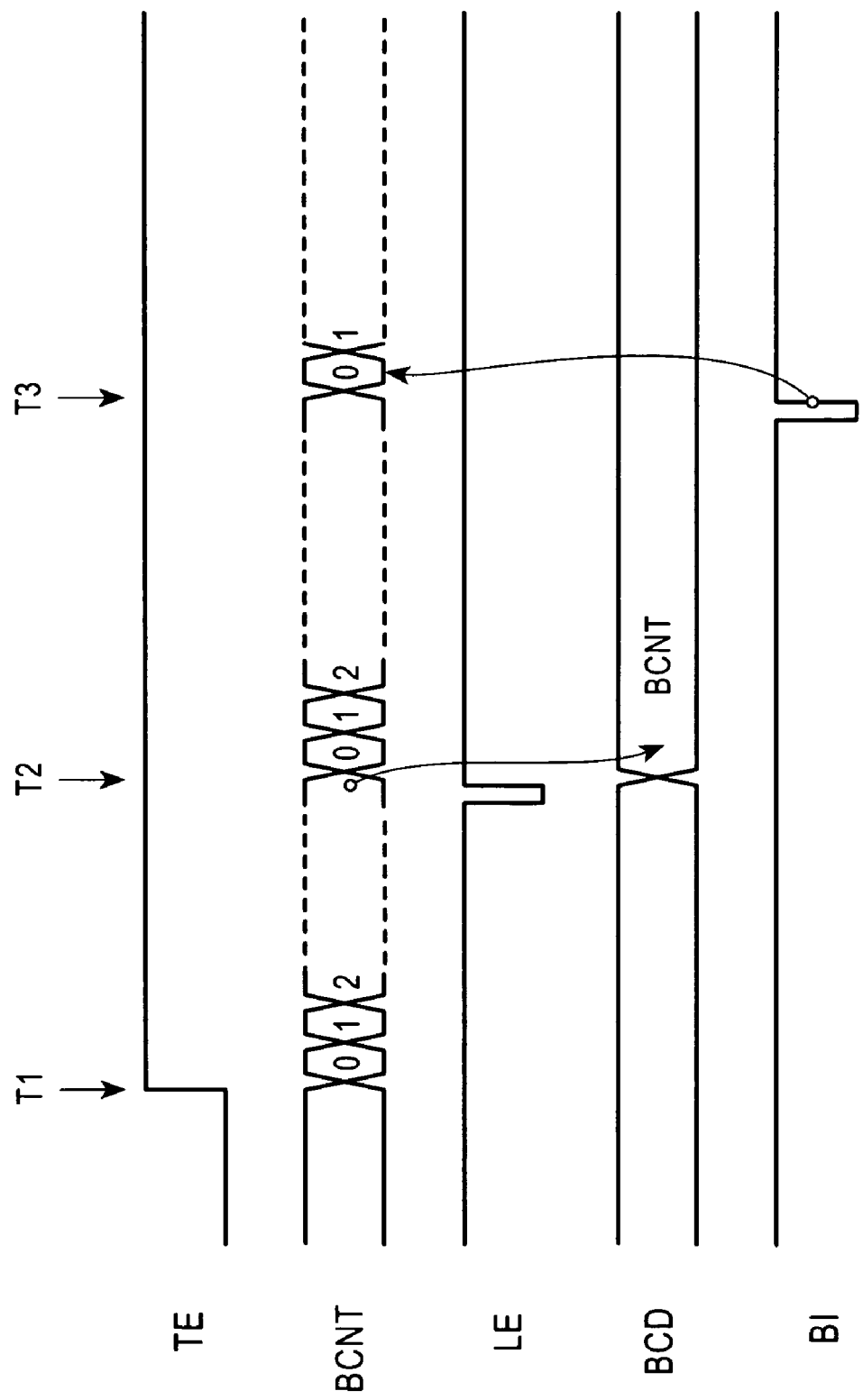
FIG. 3 is a timing chart depicting the operation of the terminal shown in FIG. 1.

At the same time, the controller 130 rises the timer enable signal TE (see the timing T1 in FIG. 3). Thus, the beacon counter 142 starts the counting operation. At this time, the beacon comparator 143 is not operating (as mentioned above), and the beacon counter 142 will never be reset by the signal BI regardless what value the comparison value BCD, stored in the beacon comparison value register 141, is. Therefore the initial storage value of the beacon comparison value register 141 is arbitrary. The counting operation of the ON counter 145 is also started by the timer enable signal TE, but this does not relate to the synchronization establishment operation.

Then the terminal 100 receives the next beacon. This beacon is also converted into digital data by the demodulator 110, and is sent to the controller 130.

The controller 130 rises the load enable signal LE immediately after the controller 130 accepts this beacon (see the timing T2 in FIG. 3). Thus, the beacon comparison value register 141 captures the count value BCNT of the beacon counter 142, and holds it as a comparison value (see step S403 in FIG. 4). The storage value of the beacon comparison value register 141 is supplied to the controller 130 as the comparison value data BCD. This comparison value data BCD is sent to the beacon comparator 143, but the beacon comparator 143 is not operating, as described above, so that the beacon timer interrupt signal BI is not generated, and therefore the beacon counter 142 is not reset.

Figure 4:
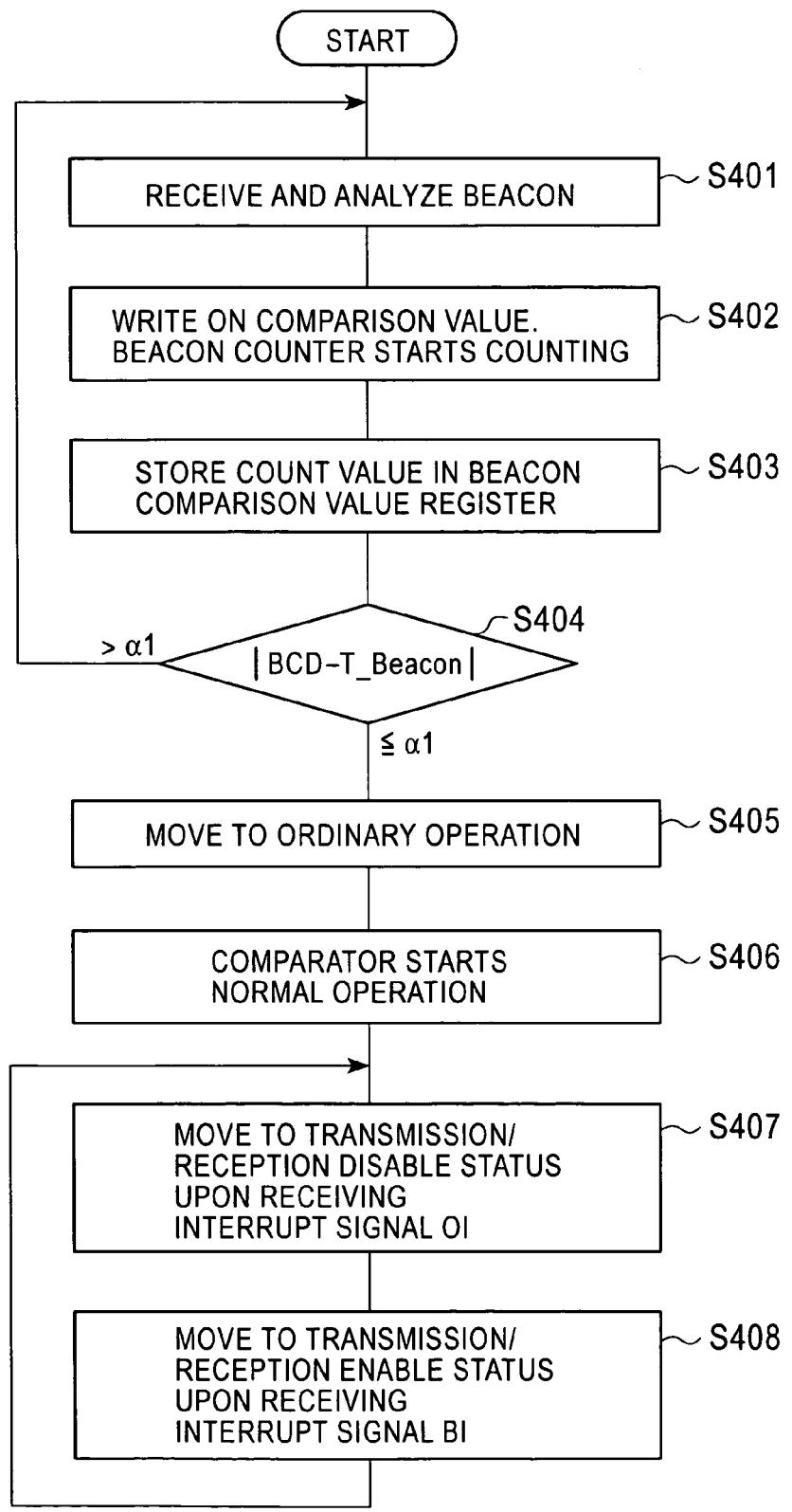
FIG. 4 is a flow chart depicting the operation of the terminal shown in FIG. 1.

The controller 130 compares this comparison value data BCD with the beacon interval T_Beacon acquired in step S401 (see step S404 in FIG. 4). If the absolute value of the difference between the comparison value data BCD and the beacon interval T_Beacon is greater than the tolerance $\alpha 1$, it is regarded that the establishment of synchronization failed, and the synchronization establishment operation in steps S401-S404 is executed again. If the absolute value of the difference of these data is not greater than the tolerance $\alpha 1$, on the other hand, the synchronization establishment operation is ended, and processing moves to the ordinary operation (see step S405 in FIG. 4).

In the ordinary operation, the controller 130 sets the terminal 100 to transmission/reception enable status, and also switches the beacon comparator 143 and the ON comparator 146 to the normal operation mode (see step S406 in FIG. 4).

Figure 10:
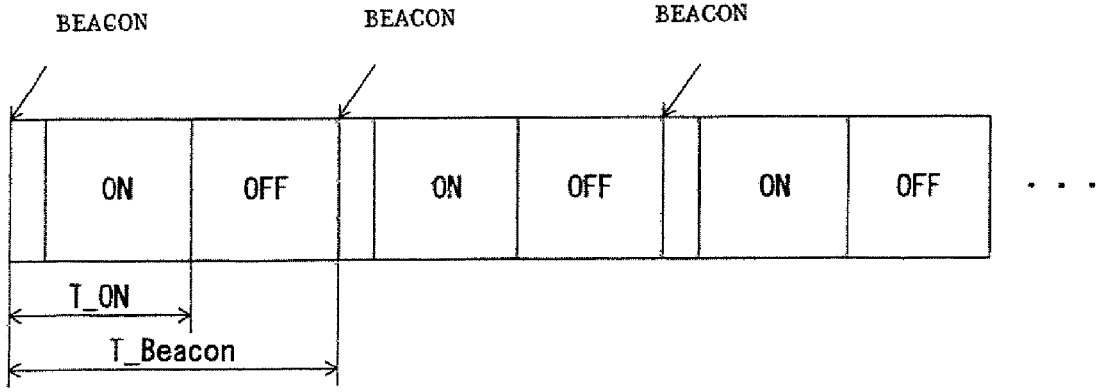
FIG. 10 is a diagram useful to explain the operation of a base station in the beacon network.
Figure 11:
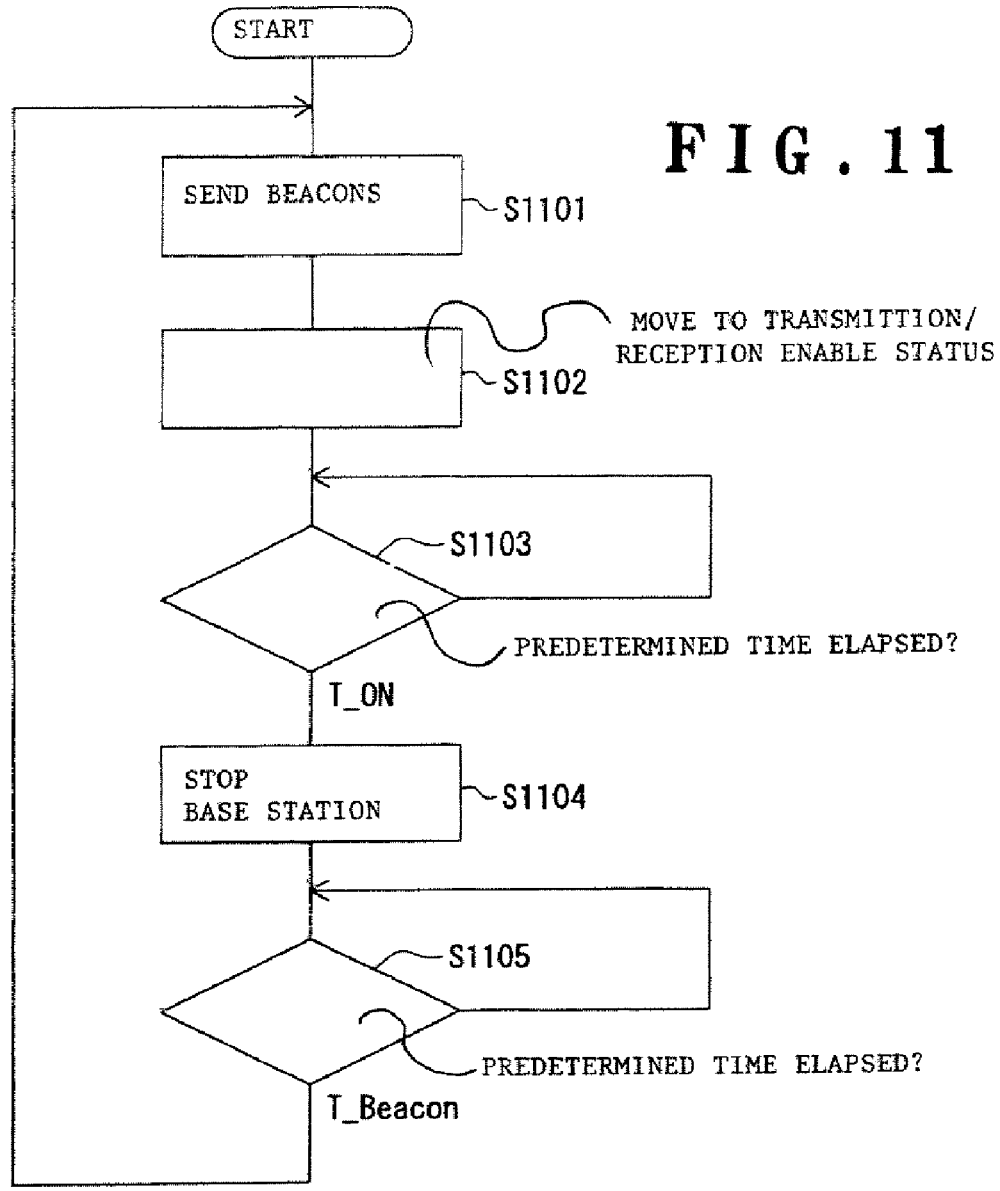
FIG. 11 is a flow chart depicting the operation of the base station in the beacon network.

After this, if the count value of the ON counter 145 and the comparison value of the ON comparison value register 144 (that is the base station transmission/reception enable time T_ON) match, the ON comparator 146 generates the ON timer interrupt signal OI (not shown in FIG. 3). This ON timer interrupt signal OI is sent to the controller 130 and the ON counter 145. Upon receiving the ON timer interrupt signal OI, the controller 130 shifts from the transmission/reception enable status to the transmission/reception disable status (see step S407 in FIG. 4 and FIG. 10). Also when the ON timer interrupt signal OI is supplied, the ON counter 145 stops counting, and resets the count value to zero.

If the count value of the beacon counter 142 and the comparison value of the beacon comparison value register 141 (that is the count value BCNT captured in step S403) match, the beacon comparator 143 generates the beacon timer interrupt signal BI (see the timing T3 in FIG. 3). This beacon timer interrupt signal BI is sent to the controller 130, beacon counter 142 and ON counter 145. When the beacon timer interrupt signal BI is supplied to the controller 130, the controller 130 shifts from the transmission/reception disable status to the transmission/reception enable status (see step S408 in FIG. 4 and FIG. 10). Upon receiving the beacon timer interrupt signal BI, the beacon counter 142 resets the count value BCNT to zero, and continues counting. Upon receiving the beacon timer interrupt signal BI, the ON counter 145 restarts operation, and starts counting from zero.

As described above, according to the present embodiment, the beacon interval measured by the beacon counter 142 is stored in the beacon comparison value register 141, instead of storing the beacon interval T_Beacon included in the beacon to the beacon comparison value register 141. When the difference between the beacon interval T_Beacon included in the beacon and the measurement result is smaller than the tolerance $\alpha 1$, this measurement result is used as the beacon interval. Therefore, even when the clock used for the terminal 100 (that is the clock used for the beacon counter 142 and ON counter 145) does not precisely match the clock of the base station, precise synchronization can be established between the base station and the terminal 100.

In addition, simply measuring the beacon interval with the beacon counter 142 is sufficient. A special circuit, such as a PLL circuit, is not required. Thus, the present invention can be implemented at low cost using small scale circuits.

Second Embodiment

The synchronization establishment circuit according to the second embodiment will be described with reference to FIG. 5 to FIG. 8. The synchronization establishment circuit is used for synchronization between a base station and a terminal in the beacon network in this embodiment.

The general configuration of the beacon network is the same as a conventional beacon network (see FIG. 9), so that description thereof will be omitted.

Figure 5:
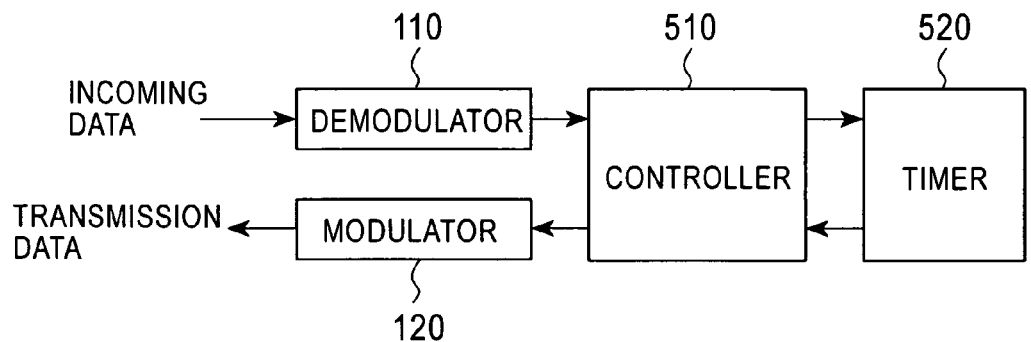
FIG. 5 is a block diagram depicting a schematic configuration of the terminal according to the second embodiment of the present invention.

FIG. 5 is a block diagram depicting a general configuration of the terminal 500 according to the present embodiment. In FIG. 5, the same elements as FIG. 2 are denoted with the same reference numerals as FIG. 2.

The difference of the controller 510 of the second embodiment from the controller 130 of the first embodiment is that a correction value and a correction value write enable signal CWE are generated in a certain case (described later).

The difference of the timer 520 of the second embodiment from the timer 140 of the first embodiment lies in that the timer 520 has a function to correct the comparison value for beacons.

Figure 6:
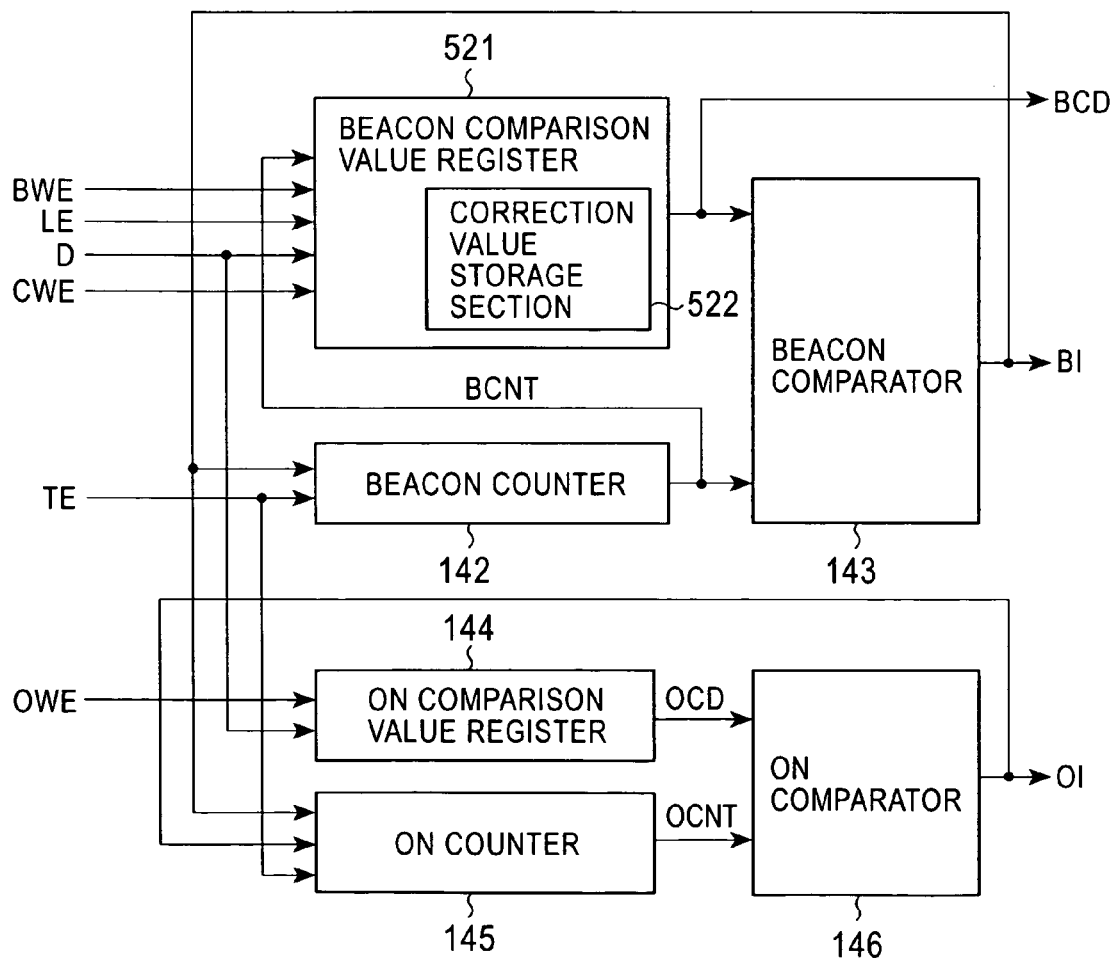
FIG. 6 is a block diagram depicting a configuration of a timer shown in FIG. 5.

FIG. 6 is a block diagram depicting the internal configuration of the timer 520. In FIG. 6, the same elements as FIG. 2 are denoted with the same reference numerals as FIG. 2.

As FIG. 6 shows, in the timer 520, the correction value storage section 522 is disposed in the beacon comparison value register 521. Accordingly, the comparison value for beacons (that is the count value BCNT captured in step S403 of the first embodiment) and the correction value BCOM (a positive value in the present embodiment) can be stored in the beacon comparison value register 521. The beacon comparison value register 521 generates the difference of these values, BCNT−BCOM. Thus, the beacon comparison value BCD after correction becomes smaller than the beacon interval T_Beacon included in the beacon, so that a stable beacon reception operation can be guaranteed even if the clock precision in the base station 910 (see FIG. 9) is poor (described later). The correction value BCOM is written by capturing the data D at the rise timing of the correction value write enable signal CWE (described later).

Now the operation of the terminal 500 will be described with reference to the timing chart in FIG. 7 and the flow chart in FIG. 8.

At first, the terminal 500 performs the synchronization establishment operation. Similar to the first embodiment, it is assumed that the beacon comparator 143 and the ON comparator 146 do not operate during the synchronization establishment operation, and therefore the signals BI and OI are not produced. Also it is assumed that zero is stored in the correction value storage section 522 as an initial value of the correction value BCOM. Thus, the beacon comparison value register 521 outputs the stored comparison value for beacons as is.

Like the first embodiment, when the terminal 500 receives the first beacon, this beacon is converted into digital data by the demodulator 110, and is sent to the controller 510.

Figure 8:
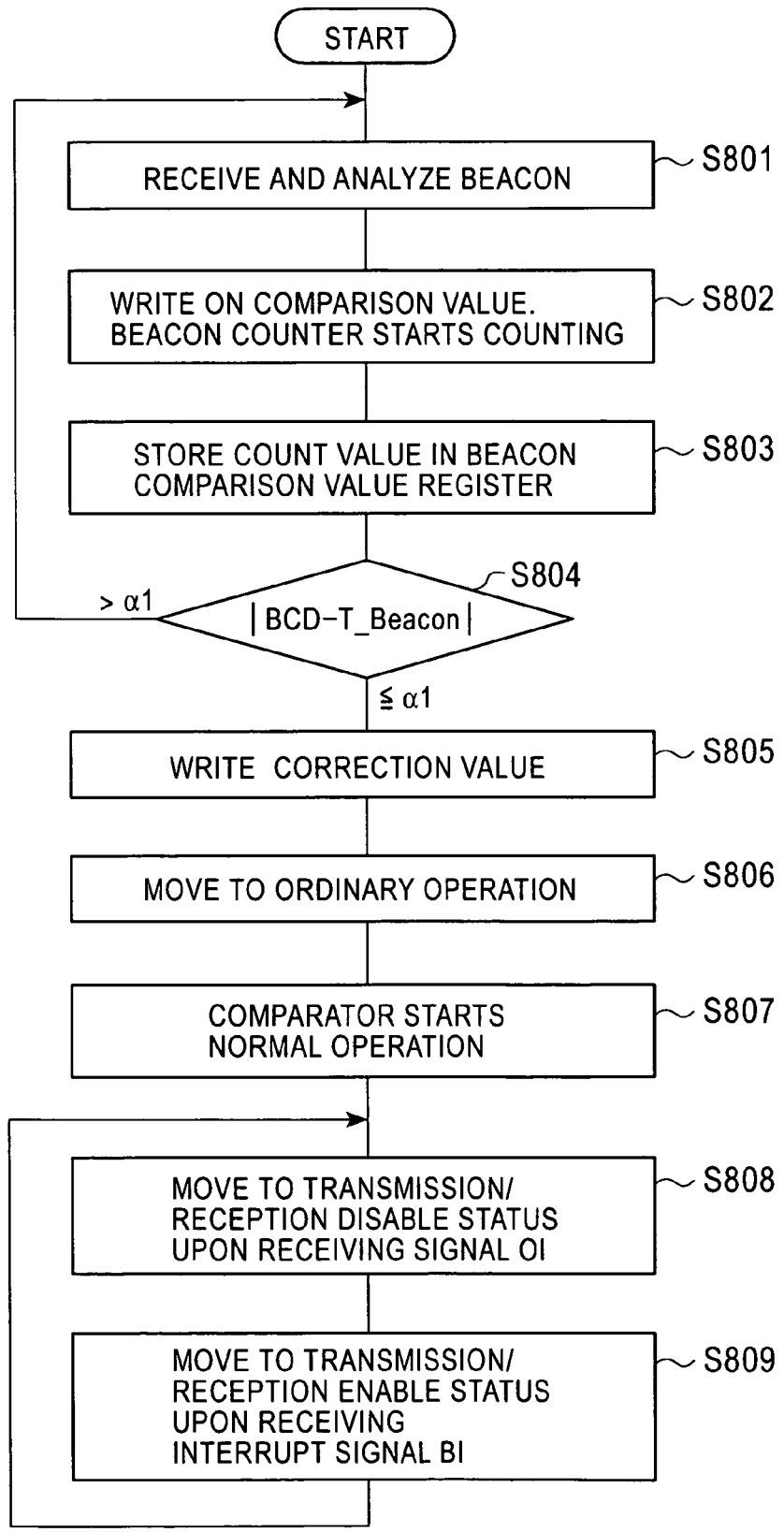
FIG. 8 is a flow chart depicting the operation of the terminal shown in FIG. 5.

The controller 510 extracts and analyzes the beacon interval T_Beacon and base station transmission/reception enable time T_ON from the input beacon (see step S801 in FIG. 8). Like the first embodiment, the controller 510 writes the base station transmission/reception enable time T_ON to the ON comparison value register 144 (step S802 in FIG. 8).

At the same time, the controller 510 rises the timer enable signal TE (see the timing T1 in FIG. 7) and causes the beacon counter 142 to start the counting operation.

Then the terminal 500 receives the next beacon. This beacon is also converted into digital data by the demodulator 110, and is sent to the controller 510.

Figure 7:
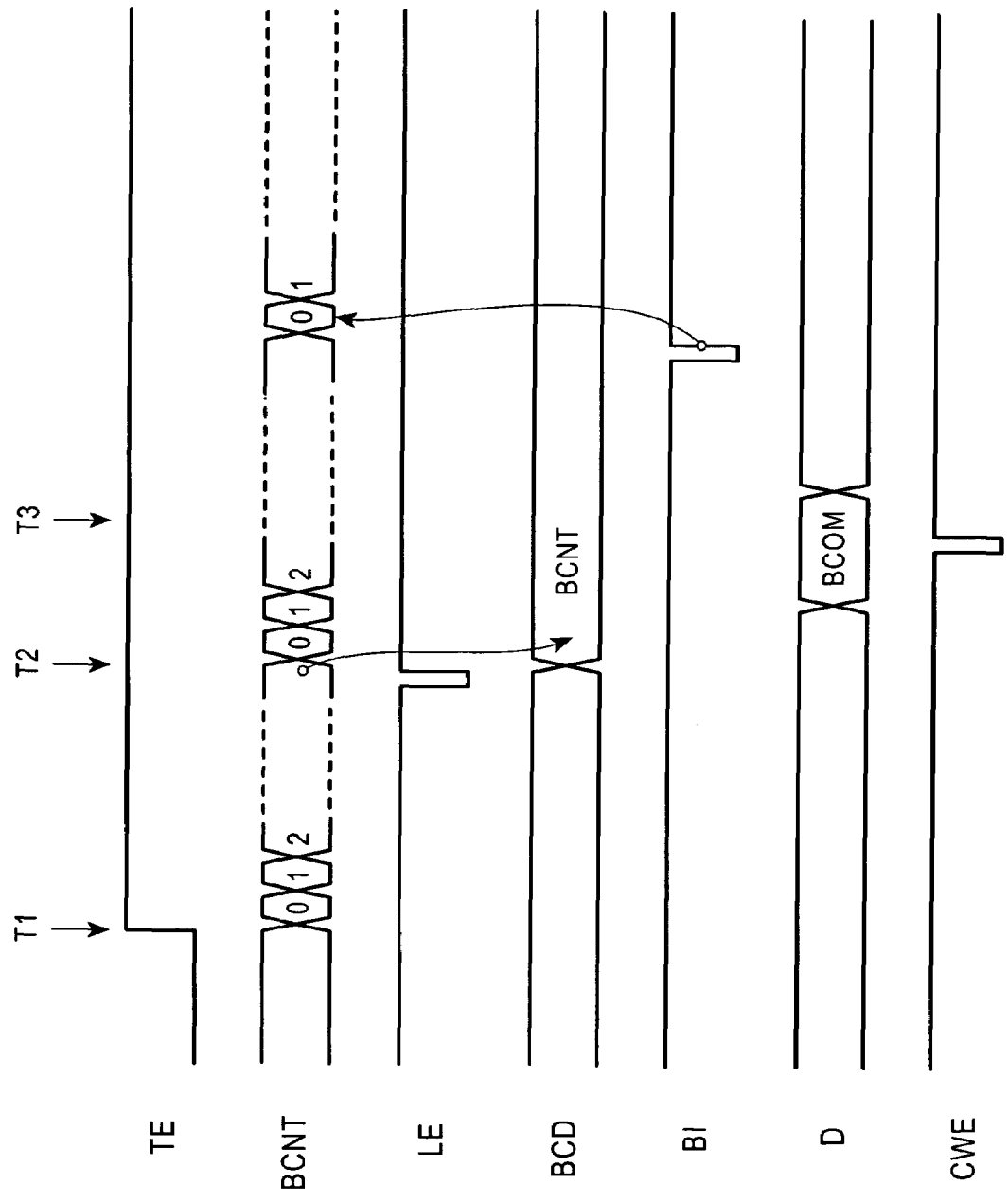
FIG. 7 is a timing chart depicting the operation of the terminal shown in FIG. 5.

Upon receiving this beacon, the controller 510 immediately rises the load enable signal LE (see the timing T2 in FIG. 7). Accordingly, the beacon comparison value register 521 captures the count value BCNT of the beacon counter 142, and holds it as a comparison value (see step S803 in FIG. 8). Since the correction value BCOM is zero, as described above, the stored value of the beacon comparison value register 521 is supplied directly to the controller 510 as the after-correction beacon comparison value BCD.

The controller 510 compares this beacon comparison value BCD with the beacon interval T_Beacon acquired in step S801 (see step S804 in FIG. 8). If the absolute value of the difference between the comparison value data BCD and the beacon interval T_Beacon is greater than the tolerance α1, it is regarded that the establishment of synchronization failed, and the synchronization establishment operation in steps S801-S804 is executed again.

If the absolute value of the difference of these data is not greater than the predetermined tolerance α1, on the other hand, it is regarded that the establishment of synchronization succeeded. At this time, the controller 510 determines whether the information representing clock precision in the base station 910 (see FIG. 9) is included in the beacon analyzed in step S801. If the base station 910 uses a clock oscillator with poor precision, the information of "poor precision clock" is included in a beacon when this beacon is generated in the base station 910. If such information is contained in the beacon, the controller 510 writes an appropriate correction value (assumed to be a positive value) in the correction value storage section 522 of the beacon comparison value register 521. In this writing, the correction value BCOM is first generated as the data D, and then the correction value write enable signal CWE is risen (see the timing T3 in FIG. 7 and step S805 in FIG. 8). The beacon comparison value register 521 captures the correction value BCOM at the rise timing of this enable signal CWE, and stores it in the correction value storage section 522. After that, the beacon comparison value register 521 outputs the difference between the beacon comparison value BCNT and the correction value BCOM, i.e., BCNT−BCOM, as the beacon comparison value BCD. Then the controller 510 ends the synchronization establishment operation (see step S806 in FIG. 8), and moves to the ordinary operation.

In the ordinary operation, the controller 510 sets the terminal 500 to transmission/reception enable status, and also switches the beacon comparator 143 and the ON comparator 146 to the normal operation mode (see step S807 in FIG. 8).

After this, if the count value of the ON counter 145 and the comparison value of the ON comparison value register 144 (that is the base station transmission/reception enable time T_ON) match, the ON comparator 146 generates the ON timer interrupt signal OI. This ON timer interrupt signal OI is sent to the controller 510 and the ON counter 145. Upon receiving the ON timer interrupt signal OI, the controller 510 shifts from the transmission/reception enable status to the transmission/reception disable status (see step S808 in FIG. 8 and FIG. 10). Upon receiving the ON timer interrupt signal OI, the ON counter 145 stops counting, and resets the count value to zero.

If the count value of the beacon counter 142 and the output BCD (BCNT−BCOM) of the beacon comparison value register 521 match, the beacon comparator 143 generates the beacon timer interrupt signal BI. This beacon timer interrupt signal BI is sent to the controller 510, beacon counter 142 and ON counter 145. When the beacon timer interrupt signal BI is supplied to the controller 510, the controller 510 shifts from the transmission/reception disable status to the transmission/reception enable status (see step S809 in FIG. 8 and FIG. 10). As described above, according to the present embodiment, the terminal 500 enters the reception status earlier than the timing provided by the beacon interval T_Beacon included in the beacon. Therefore, even if the clock precision of the base station 910 is poor, communication disable status, which would be caused when the terminal 500 has not entered reception enable status yet whereas the base station 910 has sent the data already, can be prevented. Thus, stable communication becomes possible. If the terminal 500 shifts to the transmission/reception enable status earlier than the timing provided by the beacon interval T_Beacon, the terminal 500 may start data transmission when the base station 910 is not yet in reception enable status. To avoid this, the transmission start timing of the terminal 500 may be adjusted.

Upon receiving the beacon timer interrupt signal BI, the beacon counter 142 resets the count value BCNT to zero, and continues counting. Upon receiving the beacon timer interrupt signal BI, the ON counter 145 restarts operation and starts counting from zero.

As described above, according to the second embodiment, the base station and the terminal 500 can be synchronized at high precision using inexpensive circuits, for the same reason as the first embodiment.

In addition, according to the present embodiment, the beacon comparison value BCD can be corrected by the correction value BCON, so that even if the clock precision of the base station is poor, stable communication can be performed.

This application is based on Japanese Patent Application No. 2004-109148 filed on Apr. 1, 2004, and the entire disclosure thereof is incorporated herein by reference.

What is claimed is:

1. A synchronization establishment circuit provided in a radio terminal and adapted to receive a beacon signal supplied from a remote device at a predetermined cycle and adapted to generate an internal signal in said radio terminal, comprising:
   a first counter for counting a timer clock from when a first beacon signal is received until a second beacon signal is received;
   a second counter for counting the timer clock from when said second beacon signal is received until a third beacon signal is received;
   a register for storing a first count value of said first counter and a second count value of said second counter;
   means for retrieving information about said predetermined cycle from said first beacon signal;
   a first comparator for comparing said first count value of said first counter with said predetermined cycle;
   a second comparator for comparing said second count value of said second counter with said first count value of said first counter; and
   a controller for determining whether synchronization is established between said second beacon signal and said internal signal based on a comparison result of said first comparator, wherein after the synchronization is established, said controller allows said radio terminal to receive/send a signal from/to said remote device when a comparison result of said second comparator indicates that said second count value matches said first count value.

2. The synchronization establishment circuit according to claim 1, wherein said controller re-determines said synchronization when an absolute value of a difference between said first count value stored in said register and said predetermined cycle is greater than a predetermined tolerance.

3. The synchronization establishment circuit according to claim 1, wherein said controller performs a correction processing for decreasing a cycle of said internal signal when timing precision of said beacon signal is poor.

4. The synchronization establishment circuit according to claim 1, wherein said remote device is a radio base station.

5. A synchronization establishment method for use with a radio terminal adapted to receive a beacon signal from a remote device at a predetermined cycle and adapted to generate an internal signal in said radio terminal, said method comprising:
   counting a timer clock from when a first beacon signal is received until a second beacon signal is received, thereby providing a first count value;
   counting the timer clock from when said second beacon signal is received until a third beacon signal is received, thereby providing a second count value;
   retrieving information about said predetermined cycle from said first beacon signal;
   comparing said first count value with said predetermined cycle;
   comparing said second count value with said first count value;
   determining whether synchronization is established between said second beacon signal and said internal signal based on a comparison result of said first count value with said predetermined cycle; and
   allowing, after the synchronization is established, said radio terminal to receive/send a signal from/to said remote device when said second count value matches said first count value.

6. The synchronization establishment method according to claim 5, wherein said counting to said determining are re-executed when an absolute value of a difference between said first count value and said predetermined cycle is greater than a tolerance.

7. The synchronization establishment method according to claim 5, further comprising a correction processing for decreasing a cycle of said internal signal when timing precision of said beacon signal is poor.

8. The synchronization establishment method according to claim 5, wherein said remote device is a radio base station.

9. An apparatus provided in a radio terntinal and adapted to receive a beacon signal supplied from a remote device at a predetermined cycle and adapted to generate an internal signal in said radio terminal, comprising:
   first means for counting a timer clock from when a first beacon signal is received until a second beacon signal is received;
   second means for counting the timer clock from when said second beacon signal is received until a third beacon signal is received;
   third means for storing a first count value of said first means and a second count value of said second means;
   fourth means for retrieving information about said predetermined cycle from said first beacon signal;
   fifth means for comparing said first count value with said predetermined cycle;
   sixth means for comparing said second count value with said first count value; and
   seventh means for determining whether synchronization is established between said second beacon signal and said internal signal based on a comparison result of said fifth means, wherein after the synchronization is established, said seventh means allows said radio terminal to receive/send a signal from/to said remote device when a comparison result of said sixth means indicates that said second count value matches said first count value.

10. The apparatus according to claim 9, wherein said seventh means re-determines said synchronization when an absolute value of a difference between said first count value stored in first means and said predetermined cycle is greater than a predetermined tolerance.

11. The apparatus according to claim 9, wherein said seventh means performs a correction processing for decreasing a cycle of said internal signal when timing precision of said beacon signal is poor.

12. The apparatus according to claim 9, wherein said remote device is transmitted from a radio base station.

* * * * *